United States Patent
Lien (10) Patent No.: US 8,346,475 B2
(45) Date of Patent: Jan. 1, 2013

(54) INTEGRATED POSITIONING APPARATUS AND IMPLEMENTATION METHOD THEREOF

(75) Inventor: Te Ti Lien, Taipei (TW)

(73) Assignee: MiTAC International Corp., Taoyuan (TW)

( * ) Notice: Subject to any disclaimer, the term of this patent is extended or adjusted under 35 U.S.C. 154(b) by 1092 days.

(21) Appl. No.: 12/073,583

(22) Filed: Mar. 7, 2008

(65) Prior Publication Data

US 2009/0076727 A1 Mar. 19, 2009

(30) Foreign Application Priority Data

Mar. 9, 2007 (TW) .............................. 96108265 A (51) Int. Cl.
G06F 17/00 (2006.01)
G01C 21/00 (2006.01)
G01C 21/16 (2006.01)
G01C 21/26 (2006.01)

(52) U.S. Cl. ......... 701/412; 701/445; 701/469; 701/525

(58) Field of Classification Search .................. 701/200, 701/207–209, 212–214, 216, 220–221, 400, 701/408, 409, 412, 445, 449, 450, 468, 469, 701/472, 500, 501, 512, 525; 340/988, 995.1, 340/995.19, 995.2, 995.25, 995.28; 73/1.76, 73/1.77, 1.78

See application file for complete search history.

(56) References Cited

U.S. PATENT DOCUMENTS

| | | | | |
|---|---|---|---|---|
| 6,741,209 B2* | 5/2004 | Lee | ............................. | 342/463 |
| 6,807,485 B1* | 10/2004 | Green | ......................... | 701/213 |
| 6,944,542 B1* | 9/2005 | Eschenbach | ................ | 701/220 |
| 6,972,719 B1* | 12/2005 | Swope et al. | ................ | 342/450 |
| 2003/0176970 A1* | 9/2003 | Lin | ............................. | 701/214 |
| 2007/0257836 A1* | 11/2007 | Chaplin | ................... | 342/357.08 |
| 2010/0042322 A1* | 2/2010 | Won | ............................ | 701/213 |

* cited by examiner

*Primary Examiner* — Thomas Tarcza
*Assistant Examiner* — Edward Pipala
(74) *Attorney, Agent, or Firm* — Wang Law Firm, Inc.; Li K. Wang; Stephen Hsu (57) ABSTRACT

An integrated positioning apparatus includes a processing module, a satellite positioning module, an inertial positioning module, a transmission interface and a switching module. The processing module is utilized for executing a navigation program. The satellite positioning module functions to provide satellite positioning information. The inertial positioning module is used for generating inertial positioning information. The switching module is connected between the processing module and the transmission interface for receiving a control signal furnished by the processing module and is selectively switched to a first status or a second status based on the control signal. While in the first status, the switching module drives the transmission interface to connect to the satellite positioning module so as to transmit the satellite positioning information to the processing module for navigating. While in the second status, the switching module drives the transmission interface to connect to the inertial positioning module so as to transmit the inertial positioning information to the processing module for navigating.

16 Claims, 6 Drawing Sheets

INTEGRATED POSITIONING APPARATUS AND IMPLEMENTATION METHOD THEREOF

BACKGROUND OF THE INVENTION

1. Field of the Invention

The present invention relates to an integrated positioning apparatus and implementation method thereof, and more particularly, to an integrated positioning apparatus and implementation method by taking advantage of a switching module for integrating operation processes based on an inertial positioning module and a satellite positioning module.

2. Description of the Prior Art

The global positioning system (GPS) is a precise satellite navigating and positioning system developed by the United States Department of Defense. There are twenty-six satellites distributed over six satellite orbits for the operations of the GPS. The angle between adjacent satellite orbits is set to be 55 degrees so as to cover the entire surface on earth. Any position on earth is able to receive satellite signals from about four to eight satellites for positioning at any time without being influenced by weather situations. Consequently, the position, velocity, and time related to any object or event can be easily defined by the GPS.

Over the past decades, the GPS is widely applied to a variety of commercial products not limited to military applications. Therefore, the development of the GPS has penetrated into our daily lives for acquiring the accurate information of velocity, time, position, direction and distance related to interested objects.

However, the moving direction of an object can be detected by the GPS only through the traveling of the object between two locations, and the moving direction of the object might be inaccurately detected while the velocity of the object is slow or the object is at a halt, which in turn will affect the proper operations of the navigation system based on the global positioning system. The operation situation is even worse while the navigation system is operated under the environment surrounded by lots of high rise buildings, trees, etc., which will weaken the navigation signals of the GPS and the navigated object may be appeared interruptedly or even disappeared on the screen of navigation-map. Furthermore, if the duration of phenomena of interruptedly appeared or disappeared is last for quite a while, the navigation system will be inaccurately operated and cause inconvenient situations for the users.

For that reason, the present invention provides an integrated positioning apparatus and related method to solve the aforementioned problems.

SUMMARY OF THE INVENTION

It is therefore a one of objective of the present invention to provide an integrated positioning apparatus and related method by taking advantage of a switching module for integrating operation processes based on an inertial positioning module and a satellite positioning module to completely solve the prior art problems.

The integrated positioning apparatus of the present invention comprises a processing module, a satellite positioning module, an inertial positioning module, a transmission interface and a switching module. The processing module is utilized for executing a navigation program. The satellite positioning module functions to provide satellite positioning information. The inertial positioning module includes an inertial detection module for detecting a position vector and a rotation angle, and a magnetic detection apparatus for providing direction information. The inertial positioning module is able to generate inertial positioning information based on the position vector, the rotation angle, and the direction information.

The transmission interface is connected to the processing module. The switching module is connected to the transmission interface for receiving a control signal furnished by the processing module and is selectively switched to a first status or a second status based on the control signal. While the switching module is in the first status, the switching module drives the transmission interface to connect to the satellite positioning module for transmitting the satellite positioning information to the processing module for using by the navigation program. While the switching module is in the second status, the switching module drives the transmission interface to connect to the inertial positioning module for transmitting the inertial positioning information to the processing module for using by the navigation program.

As a result, based on the integration of the satellite positioning module and the inertial positioning module, the integrated positioning apparatus of the present invention is able to integrate operation processes of the satellite positioning module and the inertial positioning module with only one universal asynchronous receiver transmitter through the switching module. Therefore, the difficulty caused by interrupted signals, weak signals, or low-speed moving object can be solved by switching the operation from the satellite positioning module to the inertial positioning module for accurately providing navigation information.

BRIEF DESCRIPTION OF THE DRAWINGS

The above and other objects and features of the present invention will become apparent from the subsequent description of preferred embodiments given in conjunction with the following accompanying drawings.

DETAILED DESCRIPTION OF THE PREFERRED EMBODIMENT

Hereinafter, preferred embodiments of the present invention will be described in detail with reference to the accompanying drawings. Here, it is to be noted that the present invention is not limited thereto.

Figure 1:
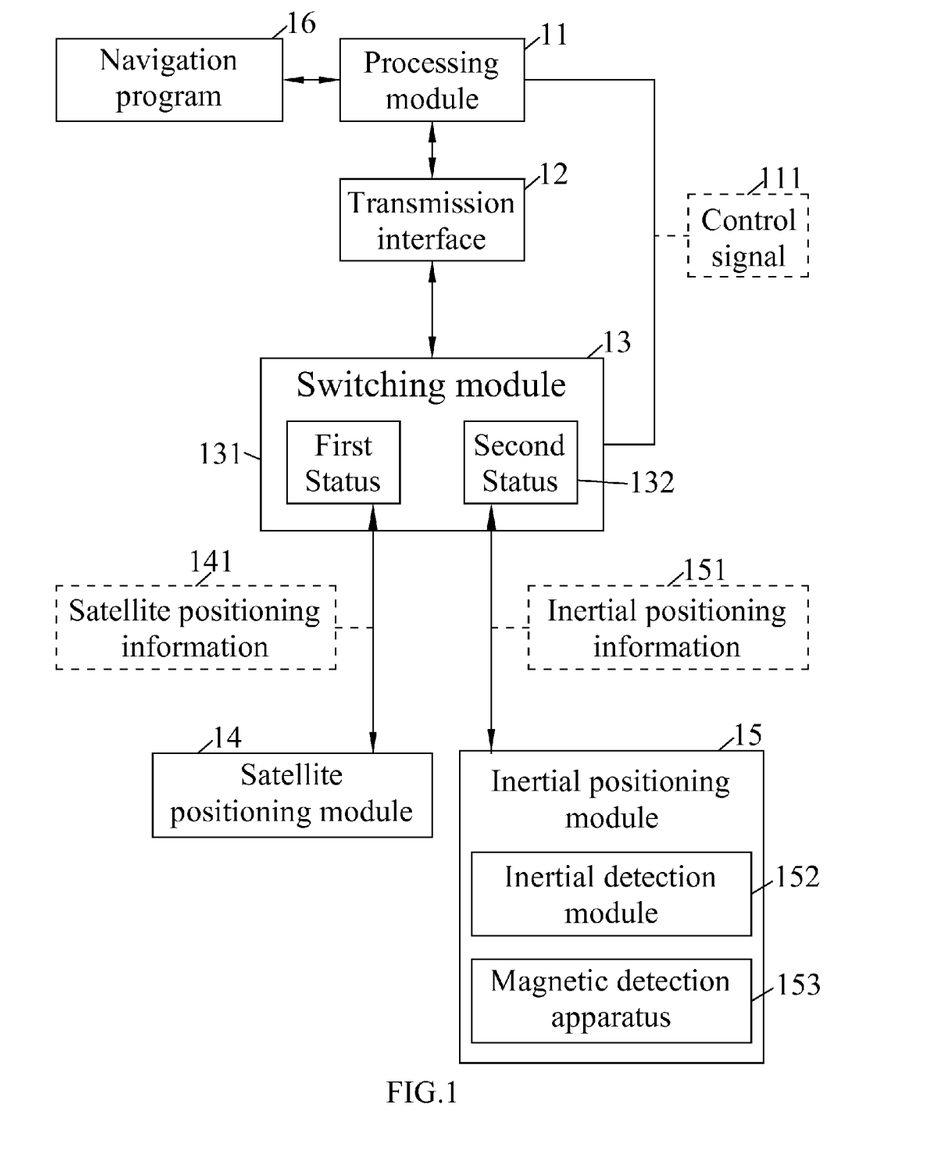
FIG. 1 is a functional block diagram of an integrated positioning apparatus of the present invention.

Please refer to FIG. 1. FIG. 1 is a functional block diagram of an integrated positioning apparatus in accordance with the present invention. The integrated positioning apparatus can be used in a carrier and comprises a processing module 11, a satellite positioning module 14, an inertial positioning module 15, a transmission interface 12 and a switching module 13.

The processing module 11 is utilized for executing a navigation program 16 for providing the navigation function, such as the function of rendering a navigation map, the function of calculating a generate a route from origin to an inputted destination, and the function of generating a navigation guide. The satellite positioning module 14 is operable to provide satellite positioning information 141. Preferably, the satellite positioning module 14 can be a global position system (GPS). The inertial positioning module 15 includes an inertial detection module 152 for detecting a position vector and a rotation angle, and a magnetic detection apparatus 153 for providing direction information. The inertial positioning module 15 can generate inertial positioning information 151 based on the position vector, the rotation angle, and the direction information. Preferably, the inertial positioning module 15 can be an inertial navigation system (INS). Preferably, the inertial detection module 152 can include an accelerometer and a gyroscope, and the accelerometer is utilized to measure the position vector of the carrier based on a detected accelerating vector of the carrier, and the gyroscope is utilized to detect the rotation angle of the carrier. Preferably, the magnetic detection apparatus 153 can be an electronic compass.

The transmission interface 12 is connected to the processing module 11. The switching module 13 is connected to the transmission interface 12 and receives a control signal 111 furnished by the processing module 11. The switching module 13 is selectively switched to a first status 131 or a second status 132 based on the control signal 111. While being in the first status 131, the switching module 13 drives the transmission interface 12 to connect the satellite positioning module 14 so that the satellite positioning information 141 can be transmitted to the processing module 11 and used by the navigation program 16 for navigating; While being in the second status 132, the switching module 13 drives the transmission interface 12 to connect to the inertial positioning module 15 so that the inertial positioning information 151 can be transmitted to the processing module 11 and used by the navigation program 16 for navigating. Preferably, the transmission interface 12 can be a universal asynchronous receiver transmitter (UART). Preferably, the control signal 111 is generated from a general-purpose I/O port (GPIO) of the processing module 11.

Figure 2:
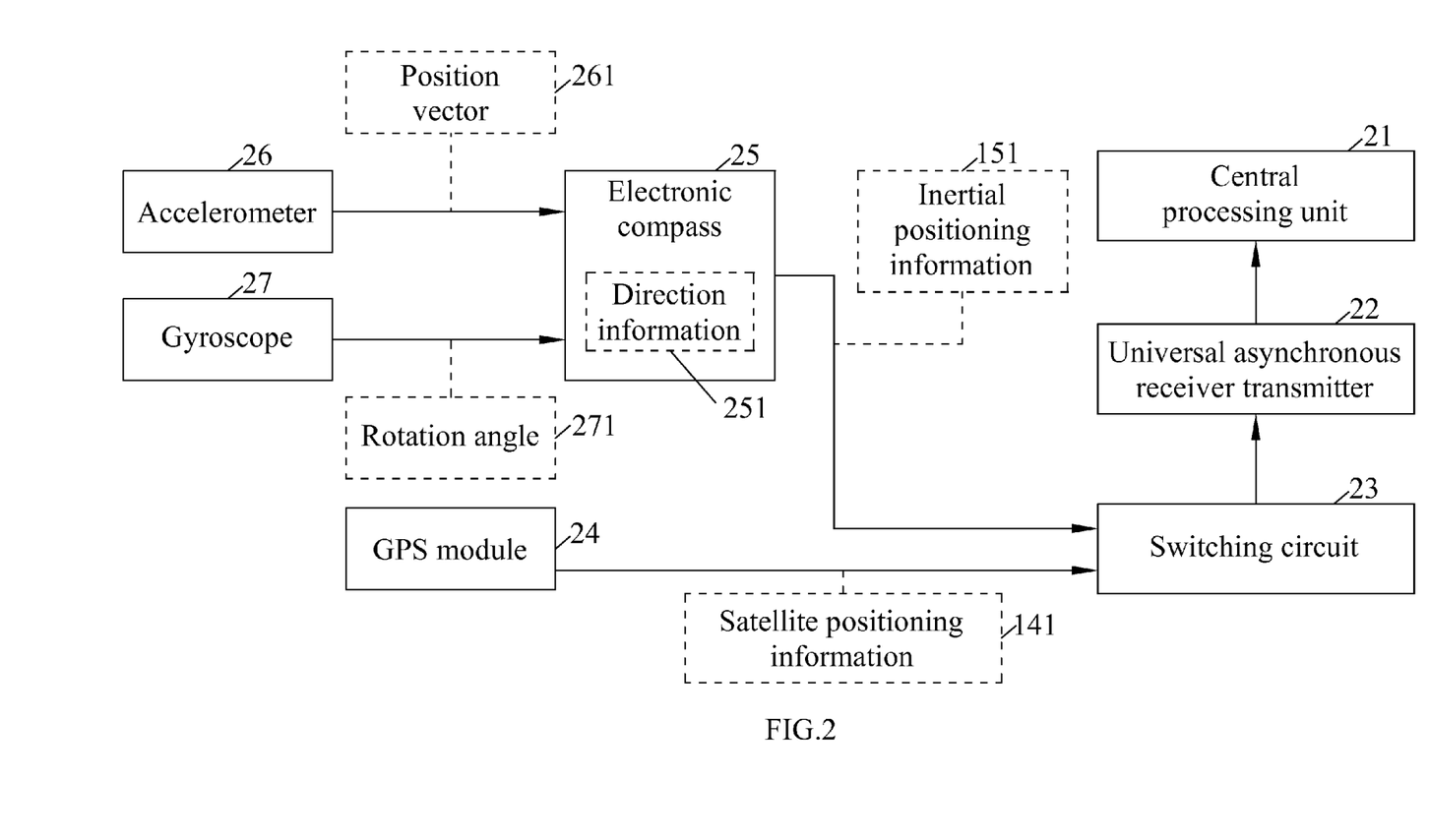
FIG. 2 shows a functional block diagram of the integrated positioning apparatus in accordance with a preferred embodiment of the present invention.

Please refer to FIG. 2. FIG. 2 shows a functional block diagram of the integrated positioning apparatus in accordance with a preferred embodiment of the present invention. The integrated positioning apparatus can be used in a carrier and comprises a central processing unit (CPU) 21, a universal asynchronous receiver transmitter (UART) 22, a switching circuit 23, a GPS module 24, an electronic compass 25, an accelerometer 26 and a gyroscope 27.

The CPU 21 is utilized to execute a navigation program. The GPS module 24 is utilized to receive satellite positioning information 141 from GPS satellites and output the information. The accelerometer 26 is utilized to detect an accelerating vector of the carrier, and then the velocity vector of the carrier can be generated by integrating the acceleration vector of the carrier, and a position vector 261 can be obtained by integrating the velocity vector of the carrier.

The gyroscope 27 is utilized to detect a rotating angular velocity of the carrier, and then a rotation angle 271 of the carrier can be obtained by integrating the rotating angular velocity of the carrier. The electronic compass 25 is utilized to measure direction information 251. By combining the position vector 261 from the accelerometer 26 with the rotation angle 271 from the gyroscope 27, the electronic compass 25 is capable of generating inertial positioning information 151.

The universal asynchronous receiver transmitter 22 is connected to the CPU 21. The switching circuit 23 is connected to the universal asynchronous receiver transmitter 22 for receiving a control signal furnished from the general-purpose I/O port of the central processing unit 21, and the switching circuit 23 is selectively switched to a first status or a second status based on the control signal.

While being is in the first status, the switching circuit 23 drives the universal asynchronous receiver transmitter 22 to connect the global positioning system module 24 which then can transmit the satellite positioning information 141 to the CPU 21. While being in the second status, the switching circuit 23 drives the universal asynchronous receiver transmitter 22 to connect the electronic compass 25 which then can transmit the inertial positioning information 151 to the CPU 21. By controlling the status switching of the switching circuit 23, the CPU 21 can receive the satellite positioning information 141 or the inertial positioning information 151 selectively.

Figure 3:
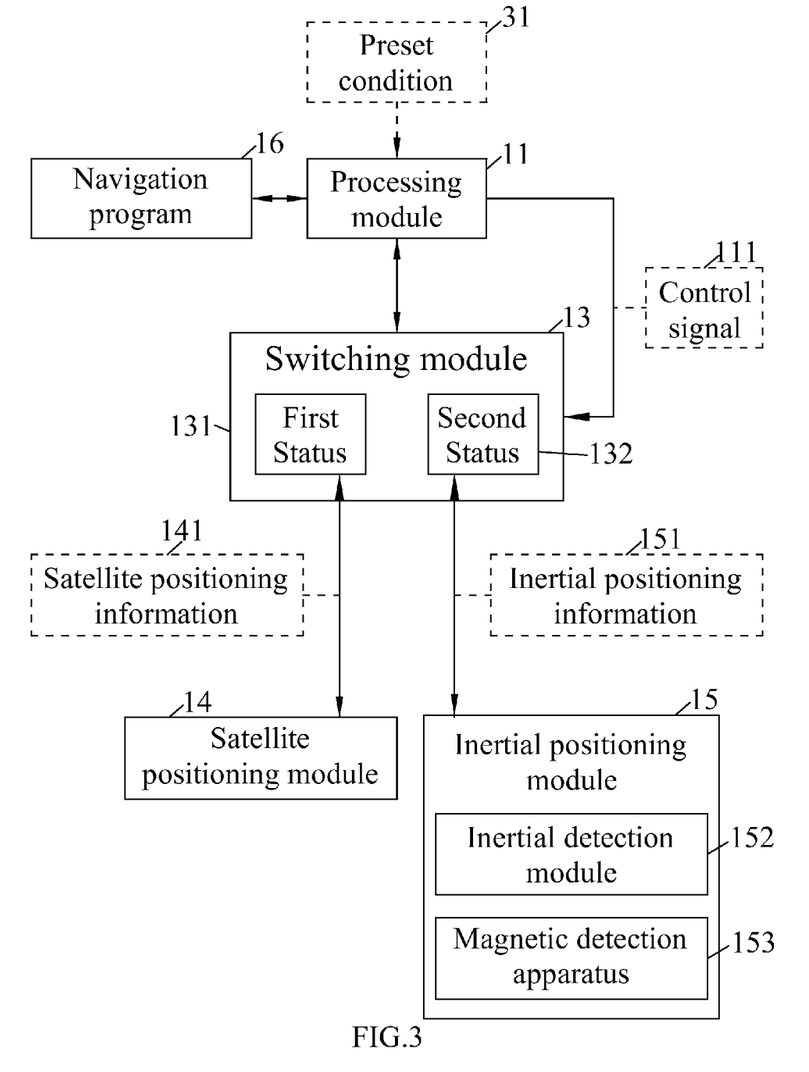
FIG. 3 provides another functional block diagram of the integrated positioning apparatus of the present invention.

Please refer to FIG. 3. FIG. 3 provides another functional block diagram of the integrated positioning apparatus of the present invention. The integrated positioning apparatus can be used in a carrier and comprises a satellite positioning module 14, an inertial positioning module 15, a switching module 13 and a processing module 11.

The satellite positioning module 14 is operable to provide satellite positioning information 141. The inertial positioning module 15 includes an inertial detection module 152 for detecting a position vector and a rotation angle, and a magnetic detection apparatus 153 for providing direction information. The inertial positioning module 15 is able to generate inertial positioning information 151 based on the position vector, the rotation angle, and the direction information.

The switching module 13 is connected to the processing module 11 for receiving a control signal 111 furnished by the processing module 11 and selectively switched to a first status 131 or a second status 132 based on the control signal 111. Preferably, the control signal 111 is generated from the general-purpose I/O port of the processing module 11.

While being in the first status 131, the switching module 13 is connected to the satellite positioning module 14 for transmitting the satellite positioning information 141 to the processing module 11. While being in the second status 132, the switching module 13 is connected to the inertial positioning module 15 for transmitting the inertial positioning information 151 to the processing module 11.

The processing module 11 functions to execute a navigation program. Furthermore, the processing module 11 can generate the control signal 111 to control the switching status of the switching module 13, thus the satellite positioning information 141 or the inertial positioning information 151 can be selectively transmitted to the processing module 11 and the navigation program can use such two kinds information for navigating respectively. Therefore, when a preset condition 31 is fitted, for example, the intensity of the satellite signal received by the satellite positioning module 14 is lower than a preset value, or the satellite signal is interrupted, or the velocity of the carrier is lower than a preset value, or the carrier is at a halt, or resolution of the navigation map rendered by the navigation program is enhanced to over a preset value, then the processing module 11 can drive the switching module 13 to switch from the first status 131 to the second status 132.

Figure 4:
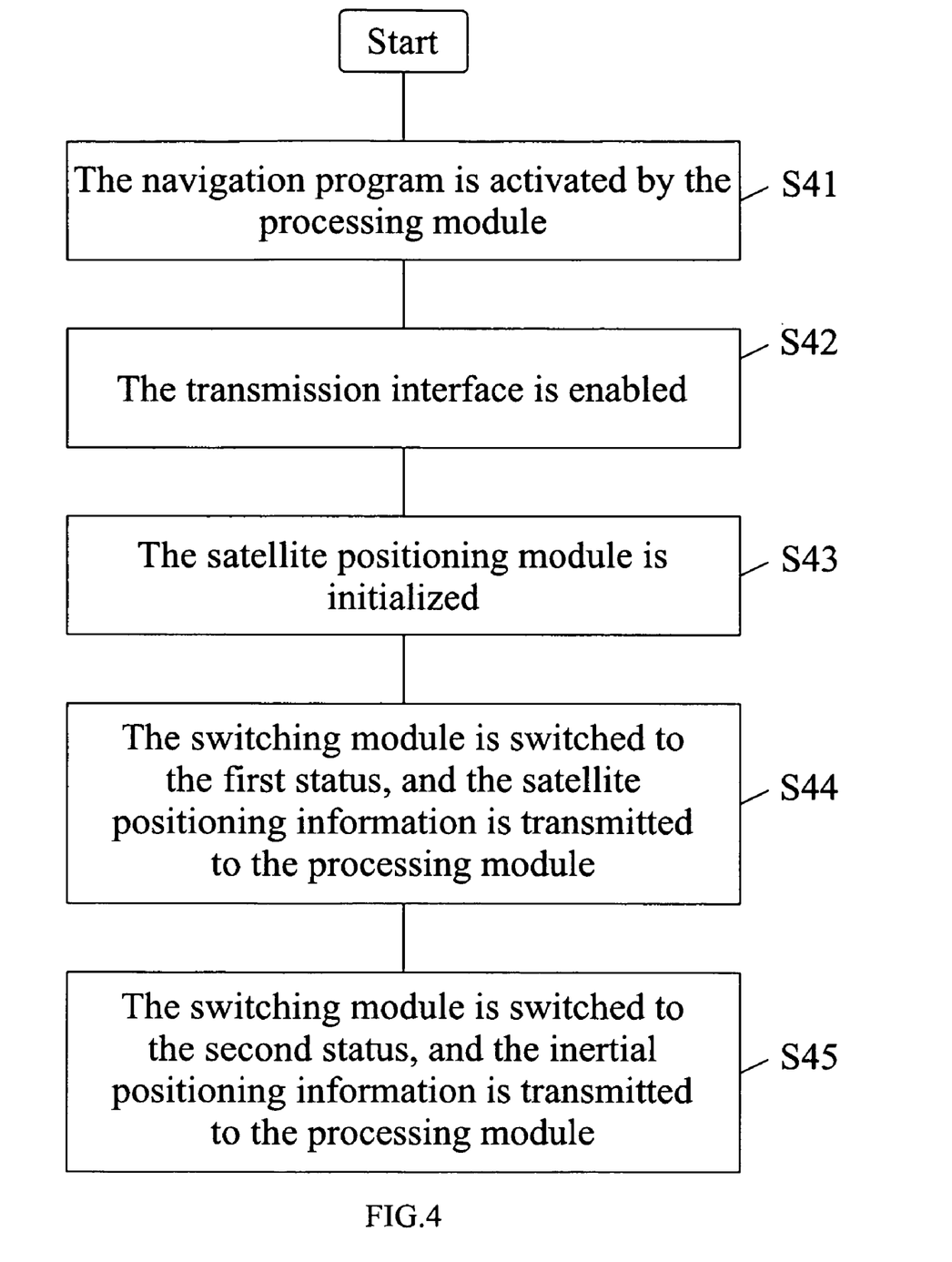
FIG. 4 presents a flowchart depicting a method related to the operations of the integrated positioning apparatus of the present invention.

Please refer to FIG. 4. FIG. 4 presents a flowchart depicting a method related to the operations of the integrated positioning apparatus of the present invention. The method in FIG. 4 comprises the following steps. In step S41 the navigation program is activated by the processing module for navigating. In step S42 the transmission interface is enabled. Preferably, the transmission interface 12 can be a universal asynchronous receiver transmitter (UART). In step S43 the satellite positioning module is initialized. Preferably, the satellite positioning module 14 can be a global position system (GPS). In step S44 the switching module is driven to switch to the first status based on the control signal generated by the processing module for connecting the transmission interface to the satellite positioning module, and transmit the satellite positioning information to the processing module for navigating based on the navigation program. Preferably, the control signal is generated from a general-purpose I/O port of the processing module.

In Step S45 the switching module is driven to switch to the second status for connecting the transmission interface to the inertial positioning module, and transmit the inertial positioning information to the processing module for navigating based on the navigation program when a preset condition is fitted. For example, the preset condition means that the intensity of the satellite signal received by the satellite positioning module 14 is lower than a preset value, or the satellite signal is interrupted, or the velocity of the carrier is lower than a preset value, or the carrier is at a halt, or resolution of the navigation map rendered by the navigation program is enhanced to over a preset value.

Figure 5:
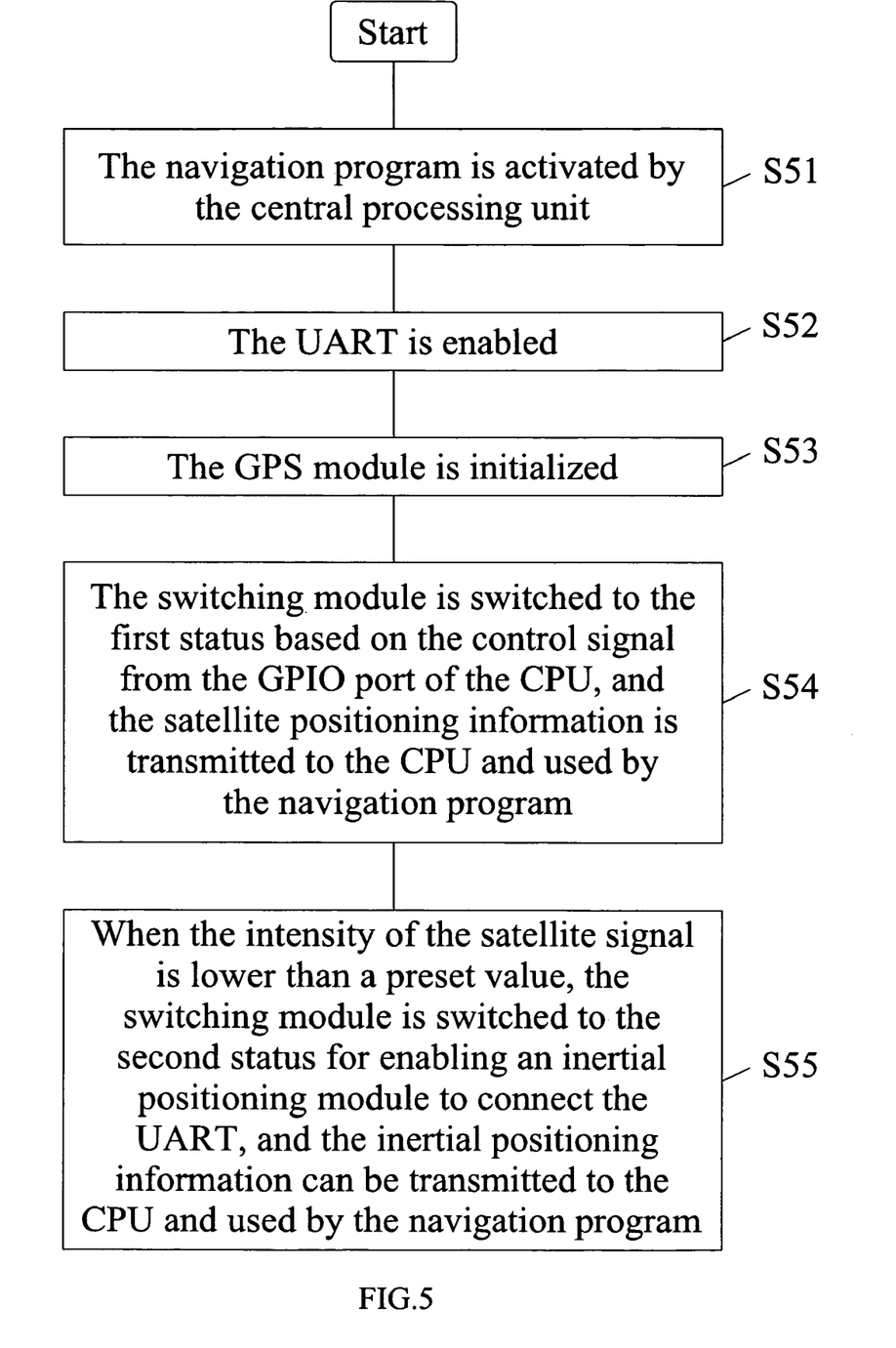
FIG. 5 presents a flowchart depicting a method related to the operations of the integrated positioning apparatus in accordance with a preferred embodiment of the present invention.

Please refer to FIG. 5. FIG. 5 presents a flowchart depicting a method related to the operations of the integrated positioning apparatus in accordance with a preferred embodiment of the present invention. The method in FIG. 5 includes the following steps. In step S51 the navigation program is activated by the central processing unit for navigating. In step S52 the universal asynchronous receiver transmitter (UART) is enabled. In step S53 the global positioning system (GPS) module is initialized to start receiving satellite positioning information from GPS satellites.

In Step S54 the switching module is driven to switch to the first status based on the control signal furnished from the GPIO port of the CPU for connecting the universal asynchronous receiver transmitter to the GPS module, so that the satellite positioning information is transmitted to the CPU and used by the navigation program for navigating.

When the intensity of the satellite signal received by the global positioning system module is lower than a preset value, in step S55, the CPU drives the switching module to switch to the second status and enable an inertial positioning module to connect the universal asynchronous receiver transmitter, so that the inertial positioning information can be transmitted to the CPU and used by the navigation program for navigating.

Figure 6:
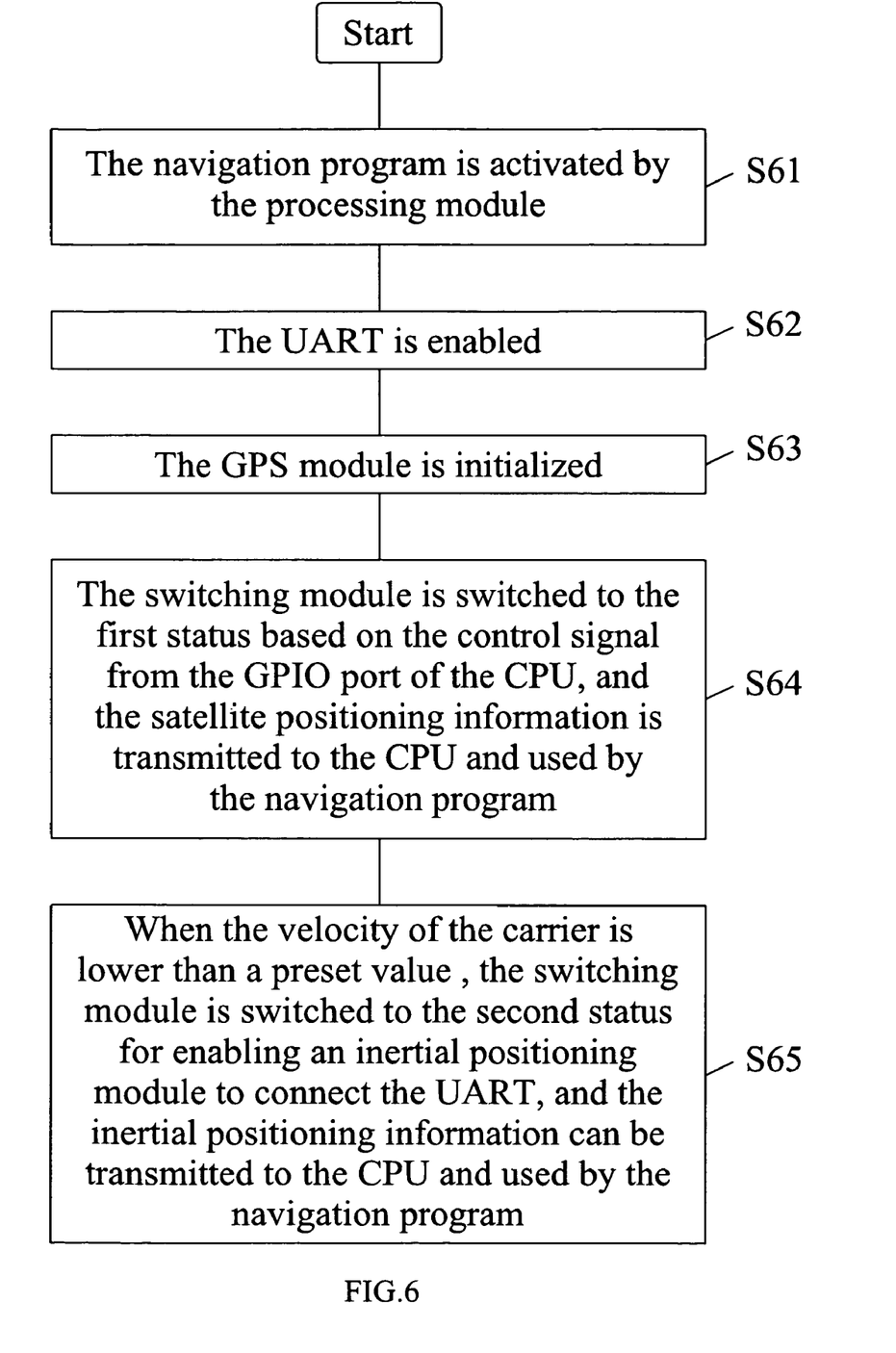
FIG. 6 presents a flowchart depicting a method related to the operations of the integrated positioning apparatus in accordance with another preferred embodiment of the present invention.

Please refer to FIG. 6. FIG. 6 presents a flowchart depicting a method related to the operations of the integrated positioning apparatus in accordance with another preferred embodiment of the present invention. The method in FIG. 6 includes the following steps. In step S61 the navigation program is activated by the central processing unit. In step S62 the universal asynchronous receiver transmitter is enabled. In step S63 the GPS module is initialized to start receiving satellite positioning information from GPS satellites.

In step S64 the switching module is driven to switch to the first status based on the control signal furnished from the general-purpose I/O port of the central processing unit for connecting the universal asynchronous receiver transmitter to the global positioning system module, so that the satellite positioning information can be transmitted to the central processing unit and used by the navigation program for navigating.

When the velocity of the carrier is lower than a preset value, in step S65, the CPU drives the switching module to switch to the second status for enabling an inertial positioning module to connect the universal asynchronous receiver transmitter, and then the inertial positioning information can be transmitted to the central processing unit and used by the navigation program for navigating.

Therefore, when navigation does not work with the satellite positioning information in the particular condition, the integrated positioning apparatus of the present invention can use inertial positioning information for navigation. It is an advantage that the architecture of the integrated positioning apparatus of the present invention only require one UART, and the other UART can retain for other application, such as Bluetooth application, so the expansion of the integrated positioning apparatus is enhanced.

While the invention has been shown and described with respect to the preferred embodiments of the present invention, it will be understood by those skilled in the art that various changes and modifications may be made without departing from the spirit and scope of the invention as defined in the following claims.

What is claimed is:

1. An integrated positioning apparatus for use in a carrier, comprising:
   a processing module, arranged for executing a navigation program, and for generating a control signal while a preset condition is met;
   a satellite positioning module, arranged for providing satellite positioning information;
   an inertial positioning module, including an inertial detection module for detecting a position vector and a rotation angle, and a magnetic detection apparatus being an electronic compass for providing direction information, wherein the electronic compass of the inertial positioning module generates inertial positioning information based on the position vector, the rotation angle, and the direction information;
   a transmission interface, connected to the processing module; and
   a switching module, arranged between the transmission interface and the satellite positioning module, and between the transmission interface and the inertial positioning module,
   wherein the switching module is selectively switched to a first status or a second status based on the control signal received from the processing module, and the switching module is switched to exclusively connect the transmission interface to the satellite positioning module for transmitting the satellite positioning information to the processing module for use by the navigation program while the switching module is in the first status, and the switching module is switched to exclusively connect the transmission interface to the inertial positioning module for transmitting the inertial positioning information to the processing module for use by the navigation program while the switching module is in the second status, such that the navigation program respectively uses either the satellite positioning information or the inertial positioning information for navigation;
   wherein the preset condition is determined according to a condition that a resolution of a navigation map used by the navigation program is enhanced over a preset value.

2. The integrated positioning apparatus of claim 1, wherein the inertial detection module comprises an accelerometer and a gyroscope, and the accelerometer is utilized to measure the position vector of the carrier, and gyroscope is utilized to detect the rotation angle of the carrier.

3. The integrated positioning apparatus of claim 1, wherein the preset condition is further determined according the condition that a velocity of the carrier being lower than a preset value.

4. The integrated positioning apparatus of claim 3, wherein the transmission interface is a universal asynchronous receiver transmitter (UART) and the said control signal is generated from a general-purpose I/O (GPIO) port of the processing module.

5. An integrated positioning apparatus for use in a carrier, comprising:
    a processing module, arranged for executing a navigation program, and for generating a control signal while a preset condition is met;
    a satellite positioning module, arranged for receiving a satellite signal and providing satellite positioning information;
    an inertial positioning module, including an inertial detection module for detecting a position vector and a rotation angle, and a magnetic detection apparatus being an electronic compass for providing direction information, wherein the electronic compass of the inertial positioning module generates inertial positioning information based on the position vector, the rotation angle, and the direction information; and
    a switching module, arranged between the processing module and the satellite positioning module, and between the processing module and the inertial positioning module, the switching module receiving the control signal furnished by the processing module and accordingly being selectively switched to a first status or a second status;
    wherein the switching module is switched to exclusively connect the processing module to the satellite positioning module for transmitting the satellite positioning information while the switching module is in the first status, and the switching module is switched to exclusively connect the processing module to the inertial positioning module for transmitting the inertial positioning information while the switching module is in the second status, such that the navigation program respectively uses either the satellite positioning information or the inertial positioning information for navigation;
    wherein the said transmission interface is a universal asynchronous receiver transmitter (UART) and the said control signal is generated from a general-purpose I/O (GPIO) port of the processing module;
    wherein the preset condition is determined according to a condition that a resolution of a navigation map used by the navigation program is enhanced over a preset value.

6. The integrated positioning apparatus of claim 5, wherein the preset condition is further determined according to the condition that the intensity of the satellite signal received by the satellite positioning module is lower than a preset value.

7. The integrated positioning apparatus of claim 5, wherein the preset condition is further determined according to the condition that the satellite signal received by the satellite positioning module is interrupted.

8. The integrated positioning apparatus of claim 5, wherein the preset condition is further determined according to the condition that the carrier is at a halt.

9. The integrated positioning apparatus of claim 5, wherein the preset condition is further determined according to the condition that velocity of the carrier being lower than a preset value.

10. A method of executing operations of an integrated positioning apparatus for use in a carrier, and the integrated positioning apparatus comprising a processing module, a satellite positioning module, an inertial positioning module, a transmission interface and a switching module, and the method including the steps of:
    activating a navigation program by the processing module;
    enabling the transmission interface to connect between the processing module and the switching module;
    initializing the satellite positioning module for obtaining satellite positioning information derived from a received satellite signal;
    driving the switching module to switch to a first status based on a control signal generated by the processing module for exclusively connecting the transmission interface to the satellite positioning module, and transmitting satellite positioning information to the processing module for use by the navigation program; and
    driving the switching module to switch to a second status based on the control signal generated by the processing module for exclusively connecting the transmission interface to the inertial positioning module for transmitting inertial positioning information to the processing module for use by the navigation program;
    wherein the control signal is generated according to a preset condition, and said preset condition is determined according to a condition that a resolution of a navigation map used by the navigation program is enhanced over a preset value.

11. The method of claim 10, wherein the preset condition is further determined according to the condition that the intensity of the satellite signal received by the satellite positioning module is lower than a preset value.

12. The method of claim 10, wherein the preset condition is further determined according to the condition that the satellite signal received by the satellite positioning module is interrupted.

13. The method of claim 10, wherein the preset condition is further determined according to the condition that the carrier is at a halt.

14. The method of claim 10, wherein the transmission interface is a universal asynchronous receiver transmitter (UART).

15. The method of claim 10, wherein the control signal is generated from a general-purpose I/O port (GPIO) of the processing module.

16. The method of claim 10, wherein the preset condition is further determined according to the condition that velocity of the carrier being lower than a preset value.

* * * * *